United States Patent
Dobrusky et al.

(10) Patent No.: US 10,113,327 B2
(45) Date of Patent: Oct. 30, 2018

(54) SECTION OF CONCRETE

(71) Applicant: LAFARGE, Paris (FR)

(72) Inventors: Svatopluk Dobrusky, Saint Quentin Fallavier (FR); Gilles Chanvillard, Saint Quentin Fallavier (FR)

(73) Assignee: LAFARGE, Paris (FR)

( * ) Notice: Subject to any disclaimer, the term of this patent is extended or adjusted under 35 U.S.C. 154(b) by 0 days.

(21) Appl. No.: 15/531,924

(22) PCT Filed: Nov. 30, 2015

(86) PCT No.: PCT/EP2015/078016
§ 371 (c)(1),
(2) Date: May 31, 2017

(87) PCT Pub. No.: WO2016/087345
PCT Pub. Date: Jun. 9, 2016

(65) Prior Publication Data
US 2017/0314285 A1    Nov. 2, 2017

(30) Foreign Application Priority Data

Dec. 1, 2014    (FR) .................................... 14 61713

(51) Int. Cl.
*E04H 12/16*    (2006.01)
*E04H 12/18*    (2006.01)
(Continued)

(52) U.S. Cl.
CPC ............... *E04H 12/16* (2013.01); *E04C 5/08* (2013.01); *E04H 12/12* (2013.01); *E04H 12/185* (2013.01);
(Continued)

(58) Field of Classification Search
CPC .......... E04C 5/08; E04H 12/12; E04H 12/16; E04H 12/342; F03D 13/10; F03D 13/20;
(Continued)

(56) References Cited

U.S. PATENT DOCUMENTS 5,333,436 A * 8/1994 Noble .................. E04H 12/085
403/337
5,687,537 A * 11/1997 Noble .................. H01Q 1/1242
403/337
(Continued)

FOREIGN PATENT DOCUMENTS

EP    2 253 782 A1    11/2010
EP    2 339 094 A1    6/2011
(Continued)

OTHER PUBLICATIONS

International Search Report as issued in International Patent Application No. PCT/EP2015/078016, dated Mar. 11, 2016.
(Continued)

*Primary Examiner* — James M Ference
(74) *Attorney, Agent, or Firm* — Pillsbury Winthrop Shaw Pittman LLP

(57) ABSTRACT

A section of concrete intended to form a mast for a windmill, the section including a first portion including a first flange, a second portion including a second flange, a prestressing device including at least one visible part located between the first flange and the second flange, a first attaching device arranged to be connected to the first flange, and/or a second attaching device arranged to be connected to the second flange.

20 Claims, 6 Drawing Sheets

(51) Int. Cl.
*E04H 12/34* (2006.01)
*F03D 13/20* (2016.01)
*F03D 13/10* (2016.01)
*E04C 5/08* (2006.01)
*E04H 12/12* (2006.01)

(52) U.S. Cl.
CPC ........... *E04H 12/342* (2013.01); *F03D 13/10* (2016.05); *F03D 13/20* (2016.05); *F05B 2230/60* (2013.01); *Y02E 10/728* (2013.01); *Y02P 70/523* (2015.11)

(58) Field of Classification Search
CPC ... F05B 2230/60; Y02E 10/728; Y02P 70/523
See application file for complete search history.

(56) References Cited

U.S. PATENT DOCUMENTS

| | | | | |
|---|---|---|---|---|
| 8,220,212 B2* | 7/2012 | Stiesdal | | E04H 12/16 52/223.13 |
| 8,272,173 B2* | 9/2012 | Jakubowski | | E02D 27/42 52/223.1 |
| 8,443,557 B2* | 5/2013 | Gevers | | E02D 27/42 52/170 |
| 8,555,600 B2* | 10/2013 | Cortina-Cordero | | E04H 12/16 52/123.1 |
| 8,720,161 B2* | 5/2014 | Herrius De Roest | | E04H 12/185 52/223.5 |
| 2002/0095878 A1* | 7/2002 | Henderson | | E04H 12/182 52/116 |
| 2003/0000165 A1* | 1/2003 | Tadros | | E04C 3/22 52/223.4 |
| 2003/0147753 A1* | 8/2003 | Ollgaard | | E04H 12/085 416/244 A |
| 2005/0166521 A1* | 8/2005 | Silber | | E04H 12/10 52/633 |
| 2006/0123735 A1* | 6/2006 | Fuellhaas | | E04H 12/085 52/741.13 |
| 2006/0156681 A1* | 7/2006 | Fernandez Gomez | | E04H 12/02 52/837 |
| 2006/0254168 A1* | 11/2006 | Wobben | | E04C 3/22 52/318 |
| 2006/0272244 A1* | 12/2006 | Jensen | | E04H 12/085 52/223.5 |
| 2008/0040983 A1* | 2/2008 | Fernandez Gomez | | E04H 12/12 52/40 |
| 2008/0041009 A1* | 2/2008 | Cairo | | E04H 12/08 52/651.07 |
| 2008/0209842 A1* | 9/2008 | Montaner Fraguet | | E04H 12/12 52/651.07 |
| 2008/0256892 A1* | 10/2008 | Franke | | E04H 12/08 52/655.1 |
| 2008/0308696 A1* | 12/2008 | Kristensen | | E04H 12/085 248/230.1 |
| 2009/0000227 A1* | 1/2009 | Jakubowski | | E04H 12/085 52/223.4 |
| 2009/0025304 A1* | 1/2009 | Irniger | | E04H 12/16 52/40 |
| 2009/0031639 A1* | 2/2009 | Cortinacordero | | E04H 12/12 52/40 |
| 2009/0142178 A1* | 6/2009 | Nieuwenhuizen | | E04H 12/085 415/2.1 |
| 2009/0300996 A1* | 12/2009 | Jones | | E04C 3/30 52/40 |
| 2009/0313913 A1* | 12/2009 | Malheiro De Aragao | | E04H 12/12 52/40 |
| 2010/0024311 A1* | 2/2010 | Wambeke | | E04H 12/085 52/40 |
| 2010/0058673 A1* | 3/2010 | Numajiri | | E04H 12/085 52/40 |
| 2010/0126079 A1* | 5/2010 | Kristensen | | B25B 13/02 52/40 |
| 2010/0126115 A1* | 5/2010 | Lim | | E04H 12/085 52/848 |
| 2010/0132282 A1* | 6/2010 | Voss | | E04C 5/07 52/223.5 |
| 2010/0281818 A1* | 11/2010 | Southworth | | E02D 27/42 52/745.17 |
| 2010/0307097 A1* | 12/2010 | Word | | E04H 12/085 52/651.07 |
| 2010/0325986 A1* | 12/2010 | Garc A Maestre | | E04H 12/085 52/223.3 |
| 2011/0138704 A1* | 6/2011 | Bagepalli | | E04H 12/12 52/147 |
| 2011/0138707 A1* | 6/2011 | Bagepalli | | E02D 27/42 52/173.1 |
| 2011/0140447 A1* | 6/2011 | Paura | | E04H 12/085 290/55 |
| 2011/0210233 A1* | 9/2011 | Fang | | F03D 13/20 248/673 |
| 2011/0232071 A1* | 9/2011 | Knoop | | B25B 23/14 29/525.02 |
| 2011/0252720 A1* | 10/2011 | Kristensen | | F03D 13/20 52/111 |
| 2012/0141295 A1* | 6/2012 | Martinez De Castaneda | | E04H 12/085 416/244 R |
| 2012/0151864 A1* | 6/2012 | Willis | | E04H 12/08 52/578 |
| 2012/0159873 A1* | 6/2012 | Puigcorbe Punzano | | E04H 12/08 52/98 |
| 2012/0159875 A1* | 6/2012 | Meyer | | E04H 12/182 52/115 |
| 2012/0266552 A1* | 10/2012 | Huynh Tong | | E04H 12/16 52/223.4 |
| 2012/0311948 A1* | 12/2012 | Hangel | | B66C 1/66 52/295 |
| 2013/0091784 A1* | 4/2013 | Schmidt | | E04H 12/182 52/115 |
| 2013/0129525 A1* | 5/2013 | Pabst | | E04H 12/12 416/244 R |
| 2013/0205686 A1* | 8/2013 | Kawabata | | E04H 12/16 52/98 |
| 2014/0033628 A1* | 2/2014 | Lockwood | | E04H 12/16 52/223.5 |
| 2014/0150359 A1* | 6/2014 | Werner | | E04H 12/085 52/223.5 |
| 2014/0157715 A1* | 6/2014 | Wagner | | E04H 12/12 52/651.07 |
| 2014/0230343 A1* | 8/2014 | Lam | | E04H 12/085 52/40 |
| 2014/0298737 A1* | 10/2014 | Fernandez Gomez | | E04H 12/12 52/220.1 |

FOREIGN PATENT DOCUMENTS

EP 2 781 673 A1 9/2014
WO WO 2013/029743 A1 3/2013

OTHER PUBLICATIONS

Search Report as issued in French Patent Application No. 1461713, dated Jul. 30, 2015.
International Preliminary Report on Patentability and then Written Opinion of the International Searching Authority as issued in International Patent Application No. PCT/EP2015/078016, dated Jun. 6, 2017.

* cited by examiner

SECTION OF CONCRETE

CROSS-REFERENCE TO RELATED APPLICATIONS

This application is the U.S. National Stage of International Application Serial No. PCT/EP2015/078016, filed Nov. 30, 2015, which in turn claims priority to French Application No. 1461713, filed Dec. 1, 2014. The contents of all of these applications are incorporated herein by reference in their entirety.

The present invention relates to the technical field of superstructures.

More particularly, the subject of the present invention is a section of concrete intended to form a mast, notably for a windmill, a mast of concrete comprising a set of sections comprising one or more of this section and a method to construct such a mast.

As the technology for producing electricity from wind energy has developed, it has been noted that there is a link between the power which can be delivered by the windmill and the dimensions of the windmill.

It is thus accepted that, in order to construct windmills capable of delivering high production powers, it is necessary to increase the length of the blades and therefore the height of the mast.

However, when increasing the height of a mast it is necessary to take into account a set of criteria which are connected on one hand to the desired technical performance of the mast, and on the other hand to the logistics of constructing the mast.

The technical performance criteria can comprise the load that has to be supported by the mast, and hence the compression resistance of the used materials, but also the tensile resistance of these materials.

Indeed, the tensile resistance is important as the loadings on the mast can cause significant tensile stresses.

The criteria linked to the logistics to be applied during the construction of the mast can, for their part, comprise the transportation of the various elements forming the mast from the production site where these elements are produced to the installation site, but also the conditions of assembling these elements on the installation site.

Together, these criteria have led to the production of masts made of concrete, to the detriment of steel, notably in order to facilitate transportation to the installation site and to reach higher heights.

This is because a concrete mast generally comprises a plurality of first elements named sections divided into a plurality of second elements named segments distributed on their periphery.

The use of segments greatly facilitates the transportation to the site. The segments can be stacked horizontally one on top of the other on a truck then assembled in sections on the installation site.

Furthermore, the use of segments also makes it possible to significantly increase the diameter of the sections and therefore the height of the mast.

However, the use of segments requires an additional step for assembling on the installation site all the segments forming the sections and this additional step can do waste a lot of time.

The use of concrete to form the segments allows, for its part, to increase the thickness of the sections and therefore also the height of the mast.

Moreover, unlike steel welds, concrete joints present a good resistance to fatigue loading, which increases the durability of the mast and makes it a material of choice for the construction of masts of great height.

It is known practice to use prestressing device to increase the tensile resistance of the concrete elements forming the mast.

This improvement of tensile resistance improves the transportability when it is applied in a production site.

It therefore appears necessary to increase the tensile resistance of the concrete elements from its release from the production site.

Furthermore, the stress exerted on the concrete can vary over time because of the phenomena of creep of the concrete and of relaxation of the prestressing device, in some cases, it is no longer possible, once the mast is erected, to control the prestressing device which could inform about the effect of the phenomena of creep of the concrete and of relaxation of the prestressing device.

That can considerably increase the industrial risk and can even make the installation of such masts made of concrete prohibitive.

It therefore appears necessary to retain the possibility of controlling, and even more the possibility of readjusting if needed, the stress exerted on the concrete during the service life of the mast.

Finally, the construction of the mast, which includes the application of the stress by the prestressing device on the installation site, can be lengthy and tedious and can be slowed down or stopped because of the weather.

The present invention aims to resolve all or some of these drawbacks mentioned above.

To this end, the present invention relates to a section of concrete intended to form a mast for a windmill, said section comprising:

- a first portion, intended to exert a bearing force on a lower adjacent part of the windmill, said first portion comprising a first flange extending substantially transversely from an internal face of the section opposite the internal volume of the section,
- a second portion, intended to form a bearing support for an upper adjacent part of the windmill, said second portion comprising a second flange extending substantially transversely from the internal face of the section opposite the internal volume of the section,
- a prestressing device arranged to apply a stress between the first portion and the second portion, said prestressing device comprising at least one visible part extending outside the section of concrete and located between the first flange and the second flange.
- a first attaching device arranged to be connected to the first flange and intended to be used to attach the section on the lower adjacent part of the windmill, and/or
- a second attaching device arranged to be connected to the second flange and intended to be used to attach the section to the upper adjacent part of the windmill.

This arrangement makes it possible to apply a stress to the concrete elements on the production site in such a way that the concrete elements better withstand the loadings from the transportation and construction, notably the tensile stresses.

This arrangement makes it possible to easily check the effects of the phenomena of creep of the concrete and of relaxation of the prestressing device during the service life of the mast, notably by checking the strain of the visible part of the prestressing device extending out of the section of concrete between the first flange and the second flange, while making it possible to easily control and eventually readjust the value of the stress on the concrete as a function of the result of this check.

Finally, this arrangement allows a simple and rapid construction of the mast on the installation site without any needs to use the prestressing device.

At last, it must be understood that a prestressing device may comprise a prestressing device by pre-tension wherein the stress is applied to the prestressing device before the setting of the concrete, and/or a prestressing device by post-tension wherein the stress is applied to the prestressing device after the setting of the concrete.

Furthermore, it must be understood that a production site is a place where the concrete elements are produced, and it may be or not in close proximity of the installation site, the installation site being the place where the windmill is intended to be erected.

According to one aspect of the invention, the concrete is an ultra-high performance concrete or an ultra-high performance concrete reinforced with fibres and/or with ordinary reinforcement.

Ultra-high performance concrete (UHPC) and ultra-high performance concrete reinforced with fibres (UHPFRC) should be understood to mean a concrete that has a characteristic compression strength value at 28 days greater than or equal to 120 MPa.

This arrangement makes it possible to increase the resistance of the concrete element and therefore reduces the thickness of a section compared to the thickness of a section made of traditional concrete.

The reduction of the thickness allows to increase the height of the section for a similar weight.

The increase of the height of the sections reduces the amount of horizontal joints and therefore the amount of weak zones.

Thus, the reduction of the thickness of the section can make it possible to transport a section presenting a length up to 20 m, preferentially up to 40 m length, and more preferentially up to 100 m length as one entire section without exceeding a transportation weight.

According to one aspect of the invention, the prestressing device comprises a plurality of holes formed on the first flange and on the second flange and cables and/or bars.

Cables can be of monostrand type or of multistrand type.

According to one aspect of the invention, each hole comprises a recess formed on the surface of the first flange on the opposite side of the second flange and/or a recess formed on the surface of the second flange on the opposite side of the first flange.

This arrangement makes it possible to limit the interaction that there could be between the ends of the cables and/or the ends of the bars and a portion of an adjacent part of the windmill forming a bearing support or exerting a bearing force on said adjacent part of the windmill.

According to one aspect of the invention, the first portion and/or the second portion comprise a reinforcing element.

This arrangement makes it possible to reinforce the first portion and/or the second portion, notably to reduce the risk of the formation of cracks upon the application of a stress by the prestressing device.

According to one aspect of the invention, the section is a modular section comprising a plurality of segments.

This arrangement makes it possible to facilitate the transportation of the sections of the mast and makes it possible to increase the diameter of the sections.

According to one aspect of the invention, the section is a one-piece section.

This arrangement makes it possible to facilitate the assembly of the mast on site.

According to one aspect of the invention, the section has a hollow cylindrical form, polygonal form or frustoconical form.

According to one aspect of the invention, the first attaching device comprises a plurality of holes formed on the first flange, and bolts and/or threaded bars intended to traverse said holes, and/or the second attaching device comprises a plurality of holes formed on the second flange, and bolts and/or threaded bars intended to traverse said holes.

This arrangement makes it possible to attach together a section and an adjacent part of the windmill using simply threaded bars and/or bolts.

According to one aspect of the invention, the plurality of holes for the prestressing device on a determined flange form a first set of holes and the plurality of holes for a determined attaching device on the determined flange form a second set of holes, the holes of each set being located at different distances from the free end of the determined flange.

According to one aspect of the invention, the holes of the first set of holes are farther from the free end of the determined flange than the holes of the second set of holes.

This arrangement makes it possible to limit the stress applied on the flanges by the prestressing device and thus reduces the risk of cracks, and at the same time provides a better partitioning of this stress on the other parts of the section.

According to one aspect of the invention, the first attaching device comprises portions connected to the prestressing device, said portions protruding beyond the first flange and being intended to traverse a lower adjacent part of the windmill, and/or the second attaching device comprises portions connected to the prestressing device, said portions protruding beyond the second flange and being intended to traverse an upper adjacent part of the windmill.

This arrangement makes it possible to use a same element as a bar and/or cables to apply a stress to the concrete element and to fasten this element to an adjacent part of the windmill.

Moreover, this arrangement allows adjusting stress by using the attaching devices.

Thus, the prestressing device can be used for the application of a first stress on the production site for example to increase the tensile resistance of the concrete element with a view to its transportation and construction.

Subsequently the first and/or the second attaching device can be used for the application of a second stress on the installation site during the construction of the mast.

This arrangement also makes it possible to apply a stress to the concrete element during the service life of the concrete mast.

Also the subject of the present invention is a mast of concrete intended for a windmill comprising a set of sections comprising one or more sections as described previously.

Also the subject of the present invention is a method to construct a mast of concrete intended for a windmill comprising the following steps:
- having a set of sections available, said set of sections comprising at least one section as described previously,
- constructing the mast on an installation site by stacking all the sections of the set of sections one on top of the other.

According to one implementation of the method, the method comprises a step wherein all the sections of the set of sections are transported to the installation site as an entire section.

According to one implementation of the method, during the constructing step of the mast, an upper adjacent part of the windmill is attached to at least one section using the second attaching device and/or at least one section is attached to an adjacent lower part of the windmill using the first attaching device.

According to one implementation of the method, the method comprises a step of applying, on the production site, to at least one section, a first value of stress between the first portion and the second portion using all or part of the prestressing device.

This arrangement makes it possible to increase the tensile resistance of the concrete element forming the section with a view to its transportation and construction.

All parts of the prestressing device are not necessarily stressed on the production site but just those necessary to secure the transportation and the assembly on the installation site.

According to one implementation of the method, the method comprises a step of applying, on the installation site, to at least one section, a second value of stress between the first portion and the second portion using the first attaching device and/or the second attaching device.

This step makes it possible to apply a second value of stress that enables the mast to withstand the various stresses that can be encountered during its service life.

According to one implementation of the method, the second value of stress is the same or greater than the first value of stress.

According to one implementation of the method, the second value of stress is applied after an upper adjacent part of the windmill is put in place.

This step makes it possible to facilitate the application of the second value of stress and allows applying stresses that would not be possible to apply on an isolated section.

According to one implementation of the method, the method comprises a step of adjusting a value of stress applied between the first portion and the second portion of a section of the mast during the service life of the mast.

This step makes it possible to limit and check the effect of phenomena of creep of the concrete and of relaxation of the prestressing device.

In any case, the invention will be well understood from the following description, with reference to the attached schematic drawings representing, by way of nonlimiting example, an exemplary section and mast according to the invention as well as a step of construction of the mast according to the invention.

Figure 1:
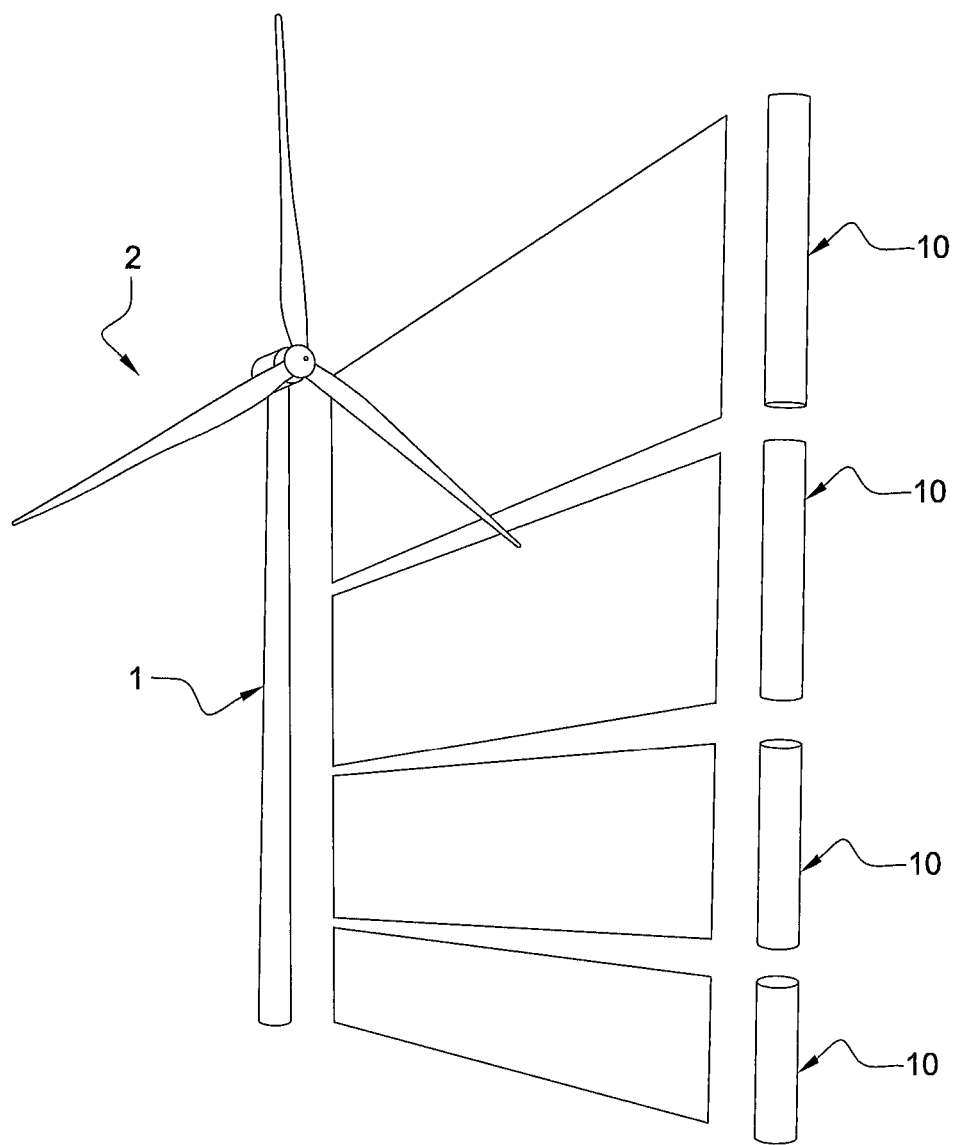
FIG. 1 shows an overview of a mast according to the invention in situ for a windmill, and an exploded projection of the same mast.

As illustrated in FIG. 1, a mast 1, notably for a windmill 2, comprises a plurality of sections 10 of concrete stacked one on top of the other.

Figure 2:
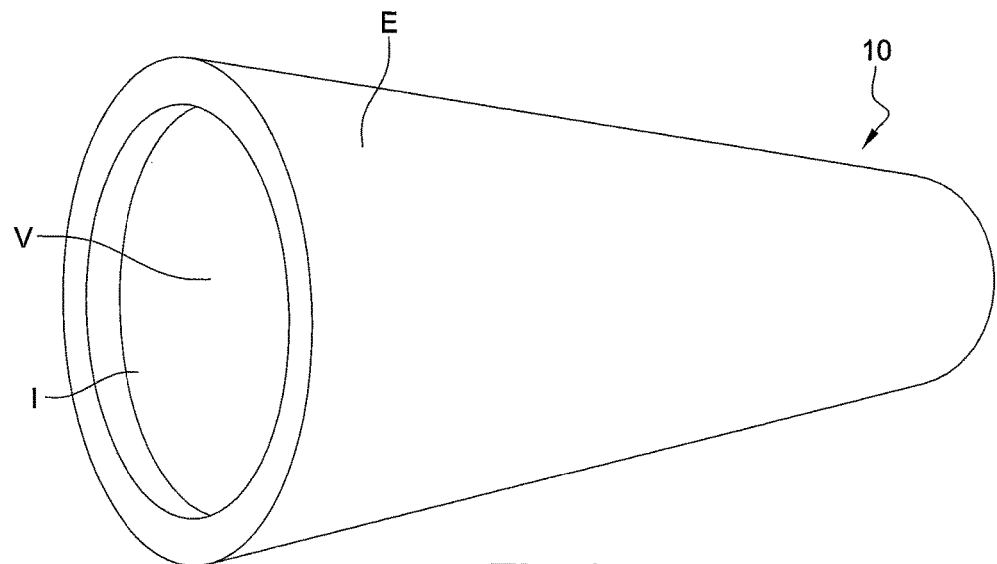
FIG. 2 shows an overview of a section according to the invention of the mast illustrated in FIG. 1.
Figure 3:
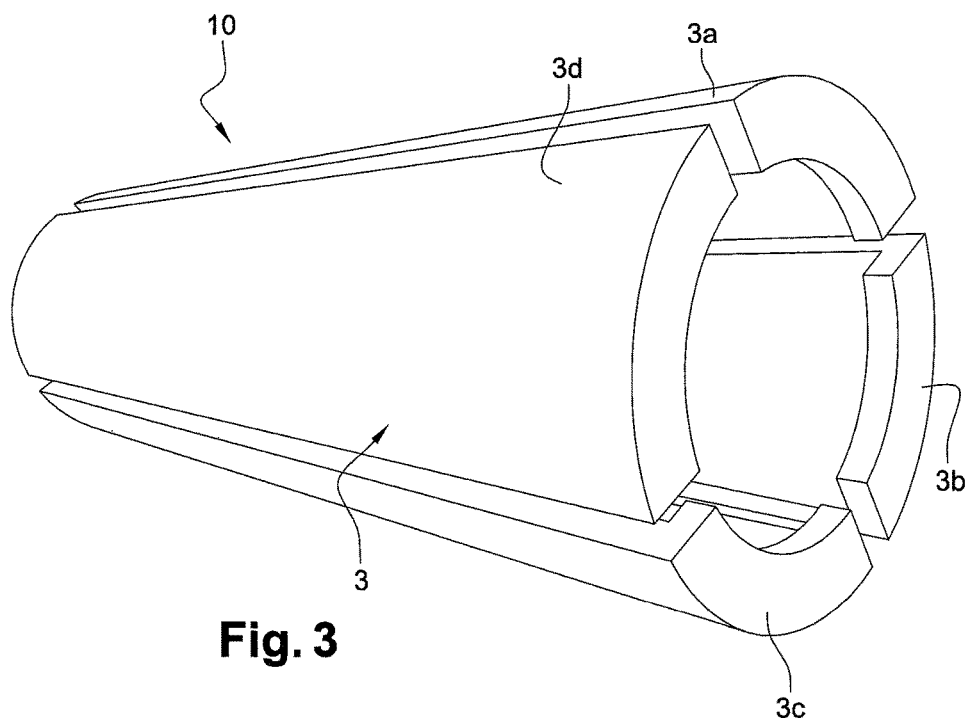
FIG. 3 shows an overview of a variant of the section illustrated in FIG. 2.

As illustrated in FIG. 2, a section 10 can be of a single piece or else, as illustrated in FIG. 3, a section 10 can comprise a plurality of segments 3. Then, such a section 10 is a modular section 10.

In the example shown in FIG. 3, the modular section 10 comprises four segments 3a, 3b, 3c, 3d.

Obviously, the present invention is in no way limited by the number of segments 3 nor by the size of the section 10 which results therefrom.

These segments 3 can be assembled together by using means known to those skilled in the art, for example with vertical joints like those described in the document WO 2013/029743 A1.

The section 10 can be also of a single piece without segments 3.

In the example presented, the section 10 is in the form of a hollow cylinder defining an internal volume V of the section 10 and an outer face E and an inner face I opposite the outer face E and arranged facing the internal volume V of the section 10.

Advantageously, the section 10 is made of ultra-high performance concrete or of ultra-high performance concrete reinforced by fibres.

Of course some ordinary reinforcement devices, as steel grids, could have been used.

This concrete can, for example, be of the type of that marketed by the company Lafarge under the trademark Ductal®.

The use of this type of concrete makes it possible to produce a lighter mast 1 than with a traditional concrete while retaining a reduced section diameter that notably allows for the transportation of sections 10 presenting a length from 15, 20 or 25 m up to 40 m as one entire section from the production site to the installation site.

In particular, a section made of one entire concrete section, which can also be made of one-piece concrete section if it is not formed from a plurality of segments, can have an outer diameter that can range up to for example 4.40 m.

As illustrated in the various FIGS. 4 to 9, a section 10 according to the invention comprises a first portion 11 intended to exert a bearing force on a lower adjacent part of the windmill 2, and a second portion 12 intended to form a bearing support for an upper adjacent part of the windmill 2.

The considered parts of the windmill 2 can be a lower adjacent section 10a of the mast 1, an upper adjacent section 10b of the mast 1, but also a nacelle, a transition piece of the windmill 2 or the foundation structure of the mast 1.

FIGS. 4 to 9 show a part of horizontal joints between two adjacent sections 10a, 10b according to the invention.

Thus, these different figures show only one of the two portions 11, 12 for a determined section 10.

However, in the different embodiments presented, the non-illustrated first portion 11 of a lower adjacent section 10a of the mast 1 is similar to the illustrated first portion 11 of the upper adjacent section 10b of the mast 1.

Similarly, the non-illustrated second portion 12 of an upper adjacent section 10b of the mast 1 is similar to the illustrated second portion 12 of a lower adjacent section 10a of the mast 1.

Obviously, the present invention is in no way limited to these particular embodiments which are given here by way of examples, and could, for example, comprise a combination of these embodiments or of other embodiments covered by the present invention.

The first portion 11 comprises a first flange 11' extending substantially transversely from the internal face I of the section 10 opposite an internal volume V of the section 10.

Similarly, the second portion 12 comprises a second flange 12' extending substantially transversely from the internal face I of the section 10 opposite an internal volume V of the section 10.

Obviously, the present invention is in no way limited to the form and the size of these flanges 11', 12'.

In the example presented, the thickness of the first flange 11' and of the second flange 12' is, for example, 300 mm.

Furthermore, a section 10 comprises a first attaching device 13a arranged to be connected to the first flange 11' and intended to be used to attach said section 10 on the lower adjacent part of the windmill 2, for example the lower adjacent section 10a of the mast 1 or else a foundation structure of the mast 1.

Similarly, a section 10 comprises a second attaching device 13b arranged to be connected to the second flange 12' and intended to be used to attach said section 10 to the upper adjacent part of the windmill 2, for example the upper adjacent section 10b of the mast 1 or else a nacelle or a transition piece of the windmill 2.

At last, a section 10 according to the invention comprises a prestressing device 20 arranged to apply a stress between the first portion 11 and the second portion 12 of the section 10.

In the presented examples, this prestressing device 20 comprises a plurality of steel bars 21 of determined length and having threaded ends 23 as well as a plurality of holes 26 formed on the flanges 11', 12' and intended to accommodate said bars 21.

These holes 26 are uniformly distributed over the circumference of the flanges 11', 12'.

Moreover, a hole 26 formed on the first flange 11' is arranged coaxially with a hole 26 formed on the second flange 12'.

The coaxial alignment between a hole 26 formed on the first flange 11' and a hole 26 formed on the second flange 12' of a same section enables a bar 21 to have a substantially vertical orientation in the section 10 after the construction of the mast 1.

The distance separating two consecutive holes 26 of a same flange 11', 12' is for example 600 mm.

Furthermore, each hole 26 can have a recess 27 formed on the surface of the first flange 11' on the opposite side of the second flange 12' of a same section 10 and a recess 27 formed on the surface of the second flange 12' on the opposite side of the first flange 11' of a same section 10.

In the example presented, this recess 27 has a square profile to ensure that a square washer 25 positioned at the bottom of the recess 27 is rotationally immobilized.

This recess 27 also has a depth enabling the threaded end 23 of a bar 21 protruding inside the recess 27 and with a nut 24 screwed on top not to protrude outside the recess 27.

Thus, the bar 21 and the nut 24 do not disturb the support of a portion 11, 12 of an adjacent section 10a, 10b on a portion 11, 12 of a determined section 10.

Furthermore, the prestressing device 20 comprises a visible part 21 extending outside the section 10 of concrete and located between the first flange 11' and the second flange 12' in the internal volume V of the section 10.

This visible part 21 makes it possible to easily check the stress applied by the prestressing device 20 and the trend of this stress over the service life of the mast 1.

Thus, this arrangement makes it possible to apply a stress to a section 10 of concrete from its production on the production site, notably to resist to the transportation, and then control this stress on installation site.

Obviously, the present invention is in no way limited to a particular type of prestressing device 20 and can comprise any equivalent technical means arranged to apply, from production on the production site, a stress between the first portion 11 and the second portion 12.

In particular, this prestressing device 20 can be of pre-tension type or of post-tension type.

For example, such a prestressing device 20 could comprise a part formed from cables gripped in the concrete during the casting of the section 10 or cables blocked by an insert or even a combination of bars and cables.

Cables can be of monostrand type or of multistrand type.

Figure 8:
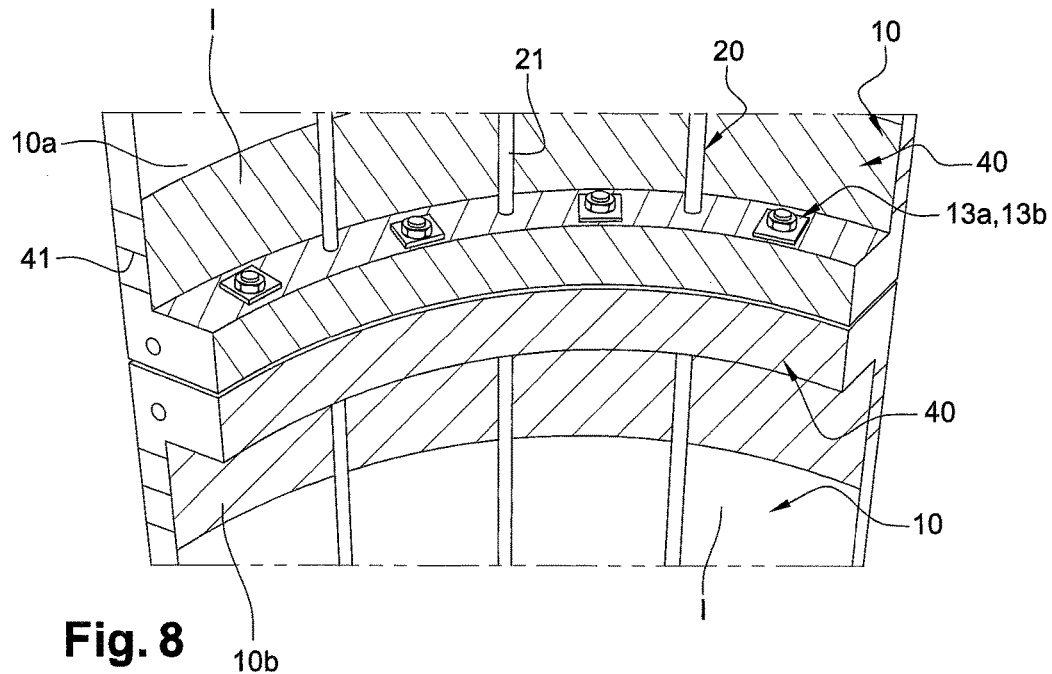
FIG. 8 shows a variant of the first embodiment illustrated in FIGS. 4 and 5.
Figure 9:
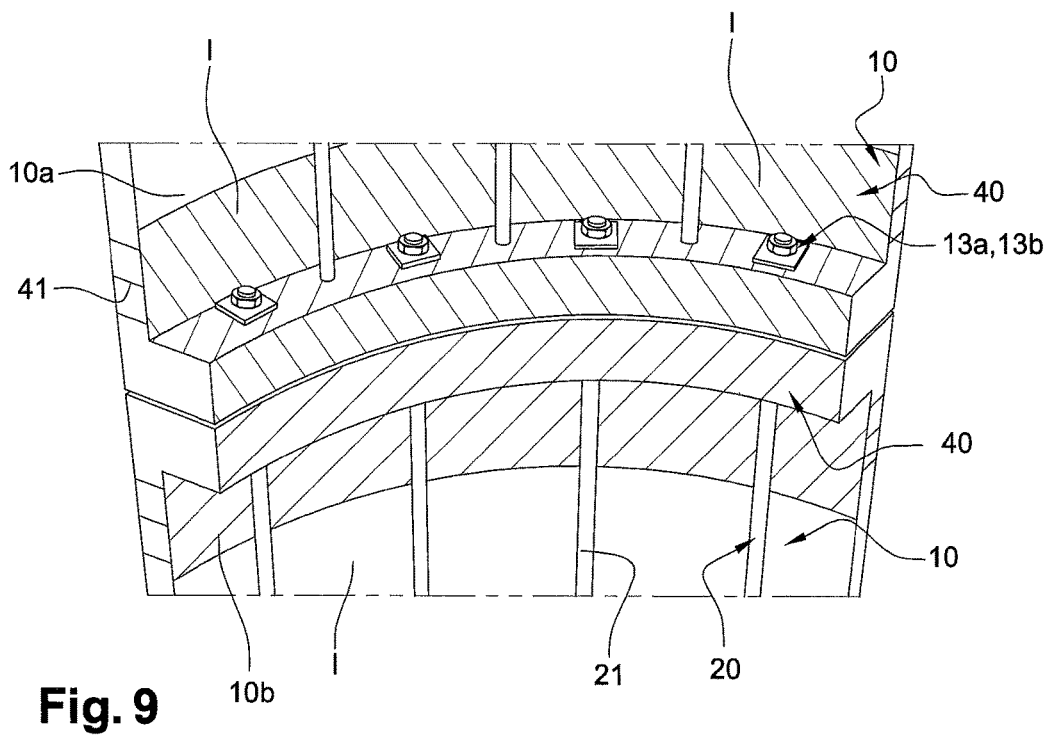
FIG. 9 shows a variant of the second embodiment illustrated in FIGS. 6 and 7.

According to a variant presented in FIGS. 8 and 9, the first portion 11 and the second portion 12 of the section 10 comprise a reinforcing element 40.

This reinforcing element 40 can be made of steel and increases the resistance of the first portion 11 and of the second portion 12 of a section 10.

This is because these portions 11, 12 arranged overhanging are subject to significant stresses, notably to the stresses exerted by the prestressing device 20.

This reinforcing element 40 closely follows the form of the portion 11, 12 considered and comprises a plurality of steel rods crossing the outer face E and the inner face I of the section 10 and linking two opposite portions of the reinforcing element 40.

This reinforcing element 40 can be for example a lost formwork used for the casting of the portions 11, 12 during the casting of the concrete on the production site to form a section 10.

Figure 4:
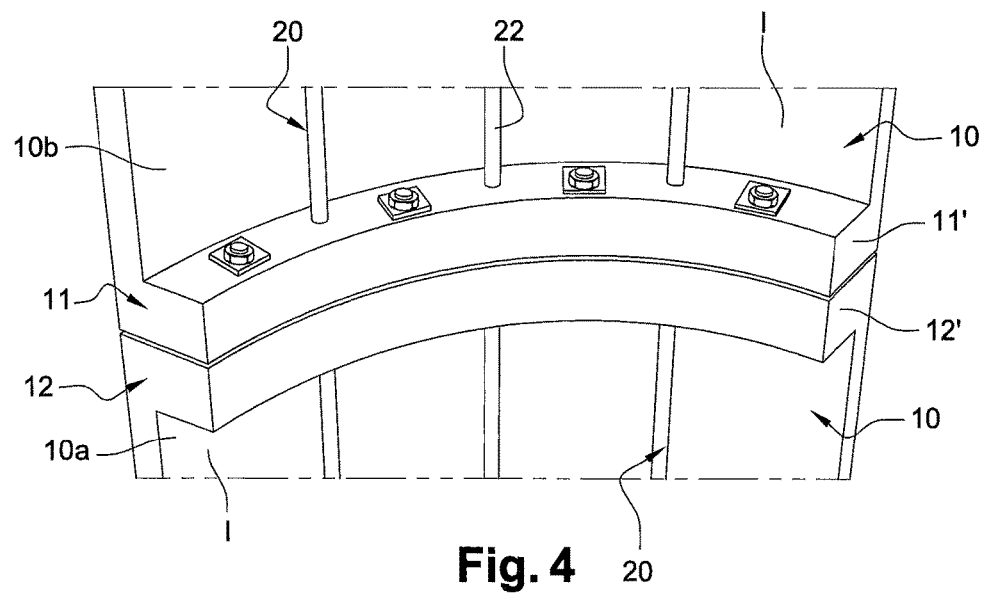
FIG. 4 shows a detail view over a part of a horizontal joint between two adjacent sections of the mast illustrated in FIG. 1 according to a first embodiment.
Figure 5:
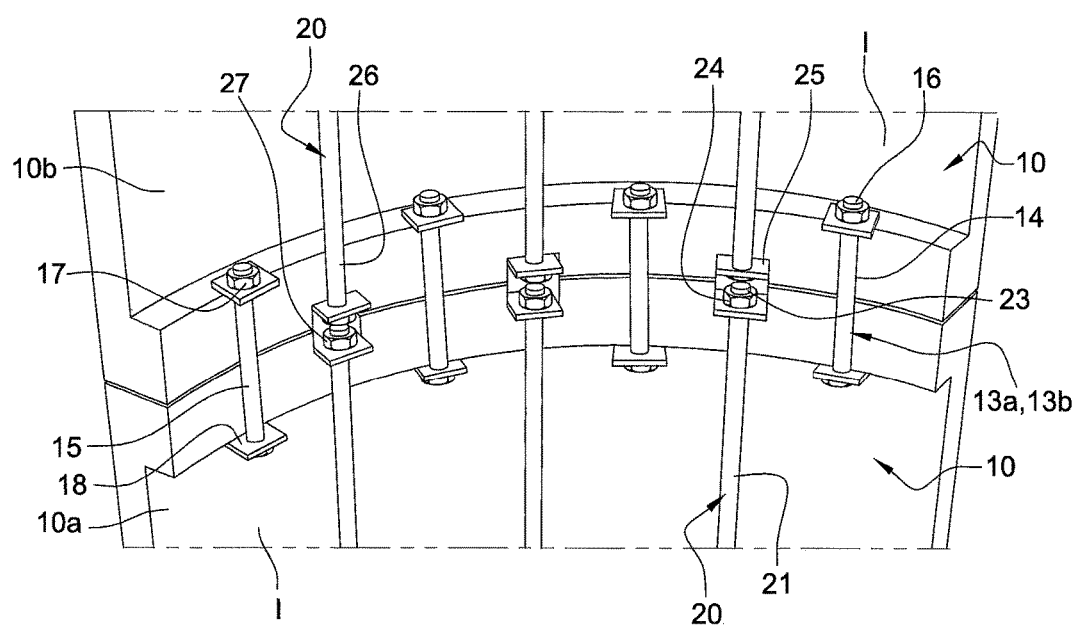
FIG. 5 shows a cross-sectional view of the part of the horizontal joint illustrated in FIG. 4.

In a first embodiment and its variant illustrated in FIGS. 4, 5 and 8, each attaching device 13a, 13b comprises a plurality of holes 14 formed on the considered flange 11', 12'.

Each of these holes 14 is arranged between two holes 26 of the prestressing device 20.

In this first embodiment, each attaching device 13a, 13b comprises also threaded bars 15 intended to traverse the holes 14 and nuts 17 intended to be screwed on said threaded bars 15.

In the presented example, the holes 14 are uniformly distributed over the circumference of the flanges 11', 12'.

The threaded bars 15 are made from steel and present a determined length.

According to a variant that is not illustrated, the threaded bars 15 could, for example, be replaced totally or partially by a plurality of tightening bolts.

In the example presented, a square washer 18 is positioned between a nut 17 and a surface of the first flange 11' opposite the second flange 12' and a surface of the second flange 12' opposite the first flange 11'.

Obviously, the present invention is in no way limited to a particular type of attaching device and can comprise any equivalent technical means arranged to produce a link between two adjacent sections 10 or even a combination of these means.

Figure 6:
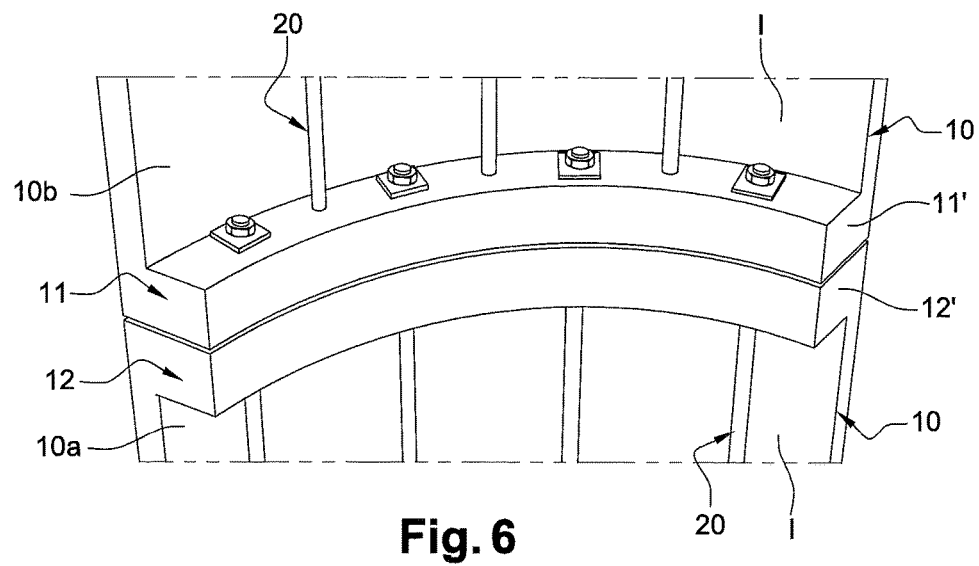
FIG. 6 shows a detail view over a part of a horizontal joint between two adjacent sections of the mast illustrated in FIG. 1 according to a second embodiment.
Figure 7:
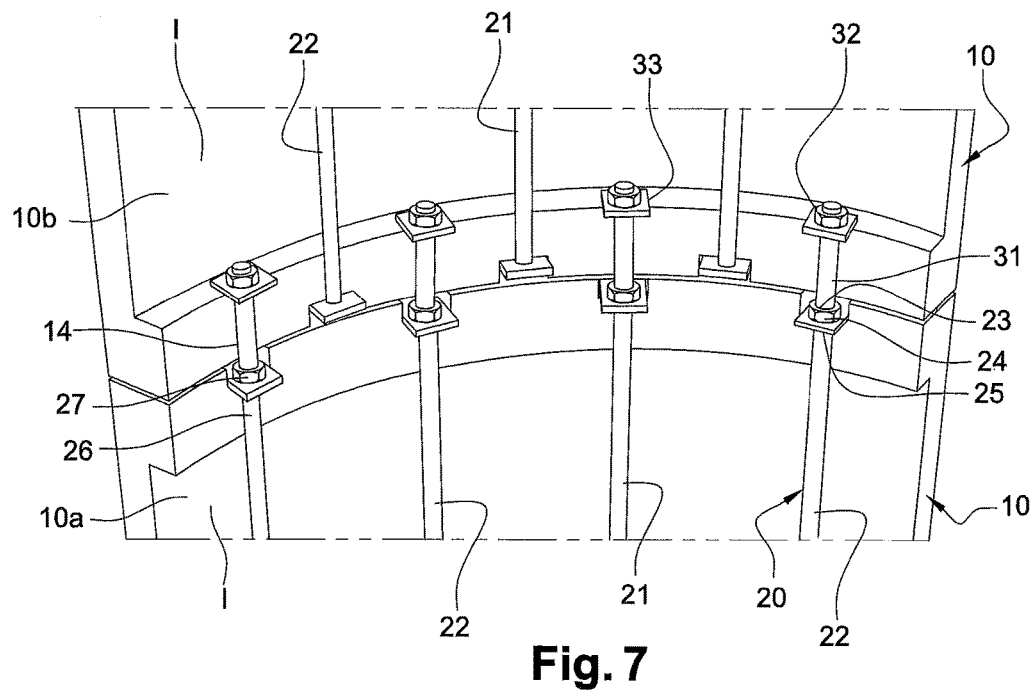
FIG. 7 shows a cross-sectional view of the part of the horizontal joint illustrated in FIG. 6.

In a second embodiment, and its variant illustrated in FIGS. 6, 7 and 9, the second attaching device 13b comprises portions 31 connected to the prestressing device 20.

These portions 31 are protruding beyond the second flange 12' and being intended to traverse an upper adjacent part of the windmill 2, here the first flange 11' of an upper adjacent section 10b.

In the presented example, the first attaching device 13a does not comprise portions 31 connected to the prestressing device 20 of the determined section 10.

However, the first attaching device 13a could have some portions from the same manner than the second attaching device 13b.

In the presented example, the first attaching device 13a of the determined section 10 comprises portions 31 connected to the prestressing device 20 of the lower adjacent section 10a.

These portions 31 are connected to the threaded end 23 of the bars 21 of the prestressing device 20 from manufacturing to form one unit and are arranged to receive a second washer 33 and a second nut 32.

In the presented example, a given bar 21 of a prestressing device 20 of a determined section 10 is arranged between two bars 21 of a prestressing device of an adjacent section 10a, 10b.

Therefore, the second embodiment allows to implement a method comprising a first step consisting to apply on the production site, to the section 10, a first value of stress between the first portion 11 and the second portion 12 using all or part of the prestressing device 20, which enables the section 10 to withstand transportation, and a second step consisting to subsequently apply, on installation site, to the section 10, a second value of stress between the first portion 11 and the second portion 12 using the second attaching device 13b, particularly the portions 31, which enables the section 10 and therefore the mast 1 to withstand the different stresses that can be encountered during the service life of the mast 1.

Thus, many options are conceivable.

Each cable or bars can be used fully or partially accordingly to their designed value of stress.

The first option consists to fully or partially use some or all bars 21 or cables of the prestressing device 20 to apply the first value of stress to the section 10 on the production site, and then to use the portions 31 of any attaching devices 13a, 13b connected to all the bars 21 or cables to apply the second value of stress to the section 10 on the installation site.

The second option consists to fully use a set of bars 21 or cables of the prestressing device 20, which are not connected to any attaching devices 13a 13b, to apply the first value of stress on the production site, and then to use the portions 31 of any attaching devices 13a, 13b connected to the bars 21 or cables, to apply the second value of stress to the section on the installation site.

In the second option, each bar 21 or cable of the prestressing device 20, which are connected to the portions 31 of the attaching devices 13a and/or 13b can be fully, or partially, or not used for the application of the first value of stress on the production site.

The value of stress applied between the first portion 11 and the second portion 12 of a section 10 of the mast 1 can be adjusted during the service life of the mast 1, which makes it possible to compensate the phenomenon of creep of the concrete and of relaxation of the prestressing device 20 and/or attaching devices 13a, 13b.

In the presented example, the application of this second value of stress is applied by screwing the second nut 32 on a portion 31 of the second attaching device 13b.

The screwing of the second nut 32 may reduce or annihilate the action of the first nut 24 of the prestressing device 20 used previously to apply the first value of stress on the production site.

Indeed, the screwing of the second nut 32 on a portion 31 connected to a bar 21 exerts a force on the first flange 11' of an upper adjacent section 10b but also on the second flange 12' of the considered section 10.

Therefore, this force leads to oppose the force exerted by the first nut 24 on this second flange 12' of the considered section 10.

In order to prevent the first nut 24 from coming into contact with the first flange 11' of the upper adjacent section 10b, the depth of the recess 21 must be sufficient.

The second value of stress is applied after an upper adjacent part of the windmill as an upper adjacent section 10b is put in place.

The second value of stress may be the same or greater than the first value of stress, this value of stress corresponding to the absolute value of stress undergone by the section 10 of concrete.

In a third embodiment not illustrated, the plurality of holes 26 for the prestressing device 20 on a determined flange 11', 12' form a first set of holes and the plurality of holes 14 for a determined attaching device 13a, 13b on the determined flange 11', 12' form a second set of holes, the holes of each set being located at different distance from a free end of the determined flange 11', 12'.

In particular, the holes 26 of the first set of holes are farther from the free end of the determined flange 11', 12' than the holes 14 of the second set of holes.

This arrangement makes it possible to limit the stress applied on the flanges 11', 12' by the prestressing device 20 and thus reduces the risk of cracks, and at the same time provides a better partitioning of this stress on the other parts of the section 10.

Thus, the holes 26 of the first set of both flanges 11', 12' can be used in production site for allowing all or part of cables and/or bars 21 of the prestressing device 20 to apply a first value of stress on the section 10 for example to increase the tensile resistance of the concrete element with a view to its transportation and construction.

All or part of the holes 14 of the second set of both flanges 11', 12' can be used on installation site for allowing cables and/or bars 21 to attach the section 10 to an adjacent part of the windmill 2 accordingly to the second embodiment and/or all or part of the holes 14 of the second set of both flanges 11', 12' can be used on installation site to attach together a section 10 and an adjacent part of the windmill 2 using simply threaded bars 15 and/or bolt accordingly to the first embodiment.

All of these three embodiments are mutually compatible.

In particular, the first embodiment can be compatible with the second embodiment since the prestressing device 20 and/or the attaching devices 13a, 13b may comprise different types of elements for a determined section 10, for example bars 15 according to the first embodiment and portions 31 connected to bars 21 according to the second embodiment.

The third embodiment only specifies the localisation of the elements of the attaching devices 13a, 13b and of the elements of the prestressing device 20 on the flanges 11', 12'.

Also the subject of the present invention is a method for constructing a mast 1 made of concrete for a windmill 2 by stacking in an installation site all the sections of a set of sections one on top of the other, at least one section of this set of sections being as described previously.

Such a method can comprise individually or in combination the methods previously described in relation to the second embodiment and to the third embodiment.

Figure 10:
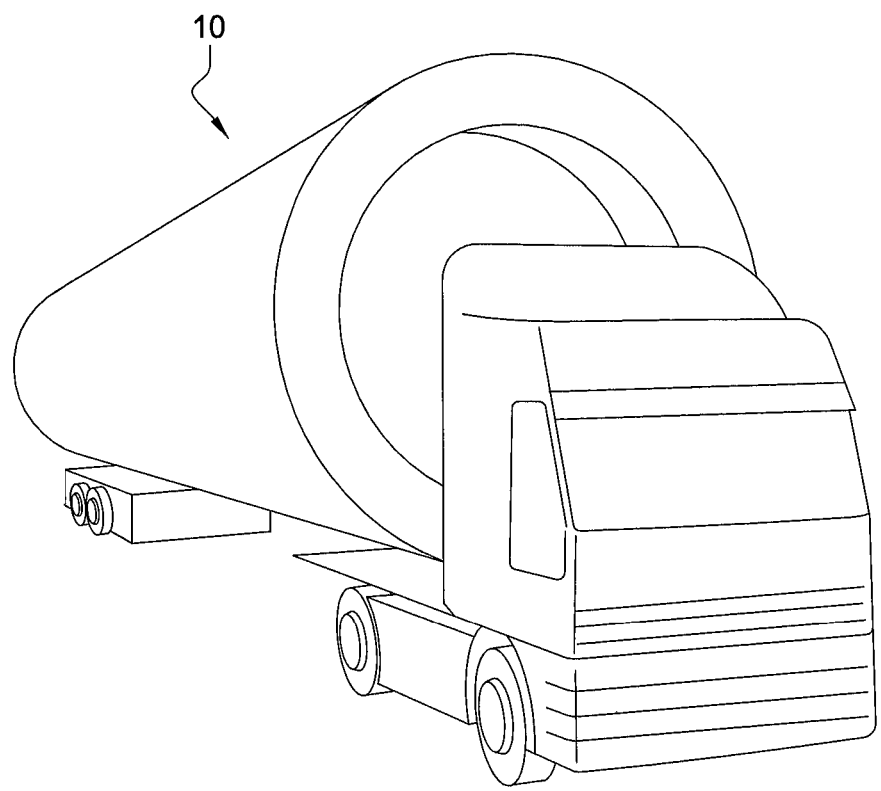
FIG. 10 illustrates a step of the method for constructing a mast made of concrete according to the invention.

Advantageously, the method can comprise a step illustrated in FIG. 10 consisting in transporting, as one entire section from the production site to the installation site all the sections 10 of the set of sections.

This section 10 can be modular or not.

Although the invention has been described in conjunction with particular exemplary embodiments, it is obvious that it is in no way limited thereto and that it comprises all the technical equivalents of the means described and their combinations.

The invention claimed is:

1. A section of concrete adapted to form a mast of a windmill, said section of concrete defining an internal volume, said section of concrete having an outer face and an internal face opposite the outer face, said internal face arranged facing the internal volume, said section of concrete comprising:
    a first portion arranged to exert a bearing force on a lower adjacent part of the windmill, said first portion comprising a first flange extending in the internal volume substantially transversely from the internal face of the section of concrete,
    a second portion arranged to form a bearing support for an upper adjacent part of the windmill, said second portion comprising a second flange extending in the internal volume substantially transversely from the internal face of the section of concrete,
    a prestressing device arranged to apply a stress between the first portion of the section of concrete and the second portion of the section of concrete, said prestressing device comprising at least one part extending outside the section of concrete and within the internal volume, said part located between the first flange of the first portion of the section of concrete and the second flange of the second portion of the section of concrete,
    a first attaching device arranged to be connected to the first flange and arranged to be used to attach the section of concrete on the lower adjacent part of the windmill, and/or
    a second attaching device arranged to be connected to the second flange and arranged to be used to attach the section of concrete to the upper adjacent part of the windmill.

2. The section of concrete of claim 1, wherein the concrete is an ultra-high performance concrete or an ultra-high performance concrete reinforced with fibres and/or with steel grids.

3. The section of concrete of claim 1, wherein the prestressing device comprises a plurality of holes formed on the first flange and on the second flange, and cables and/or bars.

4. The section of concrete of claim 3, wherein each hole comprises a recess formed on the surface of the first flange on the opposite side of the second flange and/or a recess formed on the surface of the second flange on the opposite side of the first flange.

5. The section of concrete of claim 1, wherein the first portion and/or the second portion comprise a reinforcing element.

6. The section of concrete of claim 1, wherein the section of concrete is a modular section of concrete comprising a plurality of segments.

7. The section of concrete of claim 1, wherein the section of concrete is a one-piece section of concrete.

8. The section of concrete of claim 1, wherein the first attaching device comprises a plurality of holes formed on the first flange, and bolts and/or threaded bars arranged to traverse said holes formed on the first flange, and/or the second attaching device comprises a plurality of holes formed on the second flange, and bolts and/or threaded bars arranged to traverse said holes formed on the second flange.

9. The section of concrete of claim 8, wherein the prestressing device comprises a plurality of holes formed on the first flange and on the second flange, and cables and/or bars, and wherein the plurality of holes for the prestressing device formed on one of the first and second flanges form a first set of holes and the plurality of holes for said first or second attaching device on said one of the first and second flanges form a second set of holes, the holes of each of the first set of holes and of the second set of holes being located at different distances from a free end of the said one of the first and second flanges.

10. The section of concrete of claim 9, wherein the holes of the first set of holes are farther from the free end of said one of the first and second flanges than the holes of the second set of holes.

11. The section of concrete of claim 1, wherein the first attaching device comprises portions connected to the prestressing device, said portions of the first attaching device protruding beyond the first flange and being arranged to traverse the lower adjacent part of the windmill, and/or the second attaching device comprises portions connected to the prestressing device, said portions of the second attaching device protruding beyond the second flange and being arranged to traverse the upper adjacent part of the windmill.

12. A mast of concrete adapted to form a windmill, the mast of concrete comprising a set of sections of concrete, at least one section of concrete of the set of sections of concrete defining an internal volume, said least one section of concrete having an outer face and an internal face opposite the outer face, said internal face arranged facing the internal volume, said least one section of concrete comprising:
    a first portion, exerting a bearing force on a lower adjacent part of the windmill, said first portion comprising a first flange extending in the internal volume substantially transversely from the internal face of the least one section of concrete,
    a second portion forming a bearing support for an upper adjacent part of the windmill, said second portion comprising a second flange extending in the internal volume substantially transversely from the internal face of the least one section of concrete,
    a prestressing device arranged to apply a stress between the first portion of the least one section of concrete and the second portion of the least one section of concrete, said prestressing device comprising at least one part extending outside the least one section of concrete and within the internal volume, said at least one part located between the first flange of the first portion of the least one section of concrete and the second flange of the second portion of the least one section of concrete,
    a first attaching device connected to the first flange and attaching the least one section of concrete on the lower adjacent part of the windmill, and/or
    a second attaching device connected to the second flange and attaching the least one section of concrete to the upper adjacent part of the windmill.

13. A method of constructing a mast of concrete adapted to form a windmill, the method comprising:
    providing a set of sections of concrete, said set of sections of concrete comprising at least one section of concrete defining an internal volume, said at least one section of concrete having an outer face and an internal face opposite the outer face, said internal face arranged facing the internal volume, said at least one section of concrete comprising:
- a first portion, arranged to exert a bearing force on a lower adjacent part of the windmill, said first portion comprising a first flange extending in the internal volume substantially transversely from the internal face of the at least one section of concrete,
- a second portion arranged to form a bearing support for an upper adjacent part of the windmill, said second portion comprising a second flange extending in the internal volume substantially transversely from the internal face of the at least one section of concrete,
- a prestressing device arranged to apply a stress between the first portion and the second portion, said prestressing device comprising at least one part extending outside the at least one section of concrete and within the internal volume, said at least one part located between the first flange of the first portion of the at least one section of concrete and the second flange of the second portion of the at least one section of concrete,
- a first attaching device arranged to be connected to the first flange and arranged to be used to attach the at least one section of concrete on the lower adjacent part of the windmill, and/or
- a second attaching device arranged to be connected to the second flange and arranged to be used to attach the at least one section of concrete to the upper adjacent part of the windmill, and constructing the mast on an installation site by stacking the sections of the set of sections, one section of the set of sections on top of another section of the set of sections.

14. The method of claim 13, comprising transporting the sections of the set of sections transported from a production site to the installation site as one entire section.

15. The method of claim 13, wherein during the constructing of the mast, the upper adjacent part of the windmill is attached to the at least one section of concrete using the second attaching device and/or the at least one section of concrete is attached to the lower adjacent part of the windmill using the first attaching device.

16. The method of claim 13, further comprising applying, on a production site of the at least one section of concrete, to the at least one section of concrete, a first value of said stress between the first portion of the at least one section of concrete and the second portion of the at least one section of concrete using the prestressing device.

17. The method of claim 16, wherein the first attaching device comprises portions connected to the prestressing device, said portions of the first attaching device protruding beyond the first flange and being arranged to traverse the lower adjacent part of the windmill, and/or the second attaching device comprises portions connected to the prestressing device, said portions of the second attaching device protruding beyond the second flange and being arranged to traverse the upper adjacent part of the windmill, and wherein the method further comprises applying, on the installation site, to said at least one section, a second value of said stress between the first portion of the at least one section of concrete and the second portion of the at least one section of concrete using the first attaching device and/or the second attaching device.

18. The method of claim 17, wherein the second value of said stress is the same or greater than the first value of said stress.

19. The method of claim 17, wherein the second value of said stress is applied after the upper adjacent part of the windmill is positioned on said at least one section of concrete.

20. The method of claim 13, further comprising adjusting a value of said stress applied between the first portion of the at least one section of concrete and the second portion of the at least one section of concrete of the mast during a service life of the mast.

* * * * *